United States Patent [19]

Tokarz et al.

[11] Patent Number: 5,747,171
[45] Date of Patent: May 5, 1998

[54] METHOD OF PROTECTING A SURFACE

[75] Inventors: Marek Tokarz, Kungälv; Michael Persson, Göteborg, both of Sweden; Roman Kozlowski, Krakow, Poland

[73] Assignee: Eka Chemicals AB, Bohus, Sweden

[21] Appl. No.: 635,207

[22] Filed: Apr. 17, 1996

Related U.S. Application Data

[63] Continuation of Ser. No. 211,167, filed as PCT/SE92/00418, Sep. 20, 1991, abandoned.

[30] Foreign Application Priority Data

Sep. 20, 1991 [SE] Sweden ................................. 9102737

[51] Int. Cl.$^6$ ........................................................ B32B 9/04
[52] U.S. Cl. ......................... 428/446; 428/325; 428/330; 428/331; 428/540; 428/704; 427/397.7
[58] Field of Search ................................. 428/325, 331, 428/330, 446, 704, 540, 409; 427/397.7; 52/741.3, 575

[56] References Cited

U.S. PATENT DOCUMENTS

| | | | |
|---|---|---|---|
| 1,607,762 | 11/1926 | Laurie | 106/12 |
| 3,007,878 | 11/1961 | Alexander et al. | 252/313 |
| 3,252,917 | 5/1966 | Mindick et al. | 252/313 |
| 3,699,049 | 10/1972 | Pluta et al. | 252/309 |
| 3,859,153 | 1/1975 | Beyer et al. | 161/182 |
| 3,878,034 | 4/1975 | Bever | 428/35 |
| 4,006,030 | 2/1977 | Yoshida et al. | 106/74 |
| 4,423,096 | 12/1983 | Jackson | 427/397.7 |
| 4,451,388 | 5/1984 | Payne | 252/313 |
| 4,624,898 | 11/1986 | Moore | 428/446 |
| 4,816,333 | 3/1989 | Lange | 428/331 |
| 4,921,731 | 5/1990 | Clarke | 427/314 |

OTHER PUBLICATIONS

Chemical Abstracts, vol. 114, No. 2, 14 Jan. 1991, Abstract No. 9073f, T. Sakai et al. 'Manufacture of Colloidal Silica', p. 134.
Database WPIL, Section Ch, Week 8745, 27 Mar. 1986 Derwent Publications Ltd., London, GB; Class A82, AN 87-318140.
WPI Accession No. 83-23642K/10, Onoda Cement KK: "Inorganic hardenable compsn. used e.g. as coating material contains silica sol and alunite powder", JP 58015059.
WPI Accession No. 81-69053D/38, Nippon Steel Corp: "Alkali resistant blast furnaces wall comprises high alumina and/or chamotte refractory the pores of which are soaked with silica sol", JP 56098409.

Primary Examiner—Timothy Speer
Attorney, Agent, or Firm—Burns, Doane, Swecker & Mathis, L.L.P.

[57] ABSTRACT

A method of protecting a porous material sensitive to corrosion caused by pollutants in the atmosphere. The method comprises treating the surface of the material with an agent containing more than 90% by weight of silica sol. The agent contains substantially no solid particles with a diameter exceeding about 1 micron. Porous building materials comprising a layer of gelled silica sol present in the pores below the material surface are prepared by the method.

23 Claims, No Drawings

METHOD OF PROTECTING A SURFACE

This application is a continuation of application Ser. No. 80/211,167, filed May 27, 1994, now abandoned, which is a 371 of PCT/SE92/00418.

The invention concerns a method of protecting porous material from corrosion, the method comprising treatment of the material surface with an agent containing more than 90% by weight of silica sol. The invention also concerns porous building material comprising a layer of silica within the pores below the surface.

Many buildings, ordinary houses as well as historical monuments and statues, are made of porous carbonate rich material such as limestone, dolomite, marble or calcareous sandstone which materials are sensitive to pollutants present in the air, particularly the oxides $SO_x$, $NO_x$ and $CO_2$ giving acids when dissolved in rain water. It has been established that a major cause of limestone deterioration is acidic rain and dry deposition of $SO_2$ into the stone pore system, i.e. corrosive reaction progressing between the rainfalls, for which reason also material non-exposed to rain becomes deteriorated.

It has been found that the dominating deterioration factor of carbonatic stone is the formation of a hard black crust on the surface of the stone, the crust mainly consisting of $CaSO_4.2H_2O$ (gypsum) and depositions of dust and dirt. The crust detaches very easily from the underlying stone, and when exposed to rain water, the gypsum dissolves and is transported through the pore system deep into the bulk of the stone where it crystallizes during the drying period, disrupting the stone fabric.

A common method of preserving stone involves treatment with water repellents, for example silicon organic products such as alkylsilanes or silicon resins, providing the capillary walls with a hydrophobic layer and thereby preventing the penetration of water into the stone and hindering the damage due to crystallization of gypsum in the pores. However, the treatment does not hinder the corrosive reaction at the stone surface and therefore does not counteract the formation of the gypsum crust which can easily be detached from the underlying stone. Further, water solutions of salts appearing behind the silicone treated layers lead to accelerated decay of the stone. Moreover, the silico-organic materials are relatively expensive and must also be applied as solutions in organic solvents.

In water repellent compositions it is also possible to include colloidal silica, such as disclosed in, for example, WPI Acc No. 89-289273/40, abstract of JP 1212287, WPI Acc. No. 88-245089/35, abstract of JP 63176381, or WPI Acc. No. 90-275546/34, abstract of JP 2180778. Such compositions also show the above disadvantages. Further, it is desirable to avoid including organic compounds since they will be influenced by, for example, climate, temperature, UV-light, and their properties will deteriorate with time. Moreover, organic compounds, silanes, and synthetic resins are as such unnatural elements of stones.

Another method involves coating of the stone with lime sacrificial layers, introducing fine reactive calcite at the stone surface and thus creating particularly favorable conditions for the corrosive reaction to occur. Therefore, the lime coating treatment must be repeated after a certain time interval, and after some time also the surface of the coated stone can be affected by the corrosive reaction.

U.S. Pat. No. 4,423,096 discloses treatment of ceramic construction materials with finely divided granular ceramic powder suspended in a silica sol acting as a binder. The patent does not deal with protection of carbonatic material against acidic pollutants in the air. Further, the particles would not penetrate into the pores of most materials, but coat the surface which is not satisfactory from an aesthetic point of view.

U.S. Pat. No. 3,252,917 relates to the production of "salt free" cationic silica sol. The sol is said to be useful for waterproofing building material constructed from hydraulic binding agents such as concrete or mortar, the sol being incorporated together with the other components during preparation of the material. The patent also discloses treatment of asbestos plates, cork plates or the like, but does not mention surface treatment of solid carbonatic material.

Thus, there is a current demand for a method of protecting solid carbonatic building materials against pollutants present in the air. It is therefore an objective of the invention to provide a method of inhibiting the corrosion caused by acidic rain water and by dry deposition of $SO_2$ at the surface of carbonatic materials. It is also an objective of the invention to prevent water from reaching the bulk of a porous material without stopping it from breathing. It is another objective of the invention to prevent water or salts from accumulating inside a porous material. It is still another objective of the invention to provide an effective, non-toxic and comparatively inexpensive agent for treating the surface of a carbonatic material.

The invention concerns a method of protecting a porous material sensitive to corrosion caused by pollutants present in the atmosphere, particularly porous carbonatic material. The method comprises treating the surface of the material with an agent containing more than 90% by weight of silica sol, preferably more than 95% by weight of silica sol. The agent may contain additives compatible with the silica sol and with the material to be treated. In order to improve the wetting of dirty surfaces, the agent can, for example, contain one or several surfactants which also may serve the purpose of enhancing the stability of the silica sol. For example, from about 0.05 to about 1% by weight of surfactants may be present. However, no additives are necessary and a particularly preferred method comprises treatment with an agent substantially consisting of silica sol. Particularly, it is preferred that the agent contains substantially no solid particles with a diameter exceeding about 1 µm, and most preferably it contains substantially no solid particles exceeding about 0.2 µm. It is also preferred that the agent contains substantially no organic material.

Silica sol refers to an aqueous colloidal solution of dense, non-agglomerated silica particles. A preferred sol is anionic, the silica particles thus being negatively charged. The silica content is preferably from about 5 to about 60% by weight, most preferably from about 10 to about 40% by weight, the balance preferably substantially being water. The water can originate from the preparation of the sol or from dilution of a more concentrated sol. According to one embodiment, the anionic silica sol is alkaline, the pH suitably being from about 7 to about 11, preferably from 8 to 10, most preferably from 8 to 9. According to another embodiment, the anionic silica sol is acidic, the pH suitably being from about 1 to about 7, preferably from 2 to 5, most preferably from 4 to 5. Normally, the particles in alkaline as well as acidic sols substantially consists of silica, but it is also possible to use sols in which the particles have been surface modified with for example aluminum, resulting in an anionic silica sol with its maximum stability in the pH range from about 3 to about 7 (see for example Simko F. A. "Modified Antislip Polish Additive", Soap Chem. Spec., 39(1), p 97, 99, 101, 111 (1963)).

When an alkaline anionic silica sol is applied to the surface of a porous material, the sol penetrates into the pores by means of capillary forces. No chemical reaction occurs, but due to decrease of the mean interparticle distance, the sol gels inside the pores. The porous material acts as a sieve which stops larger sol particles at narrowings separating void spaces. When the critical concentration of the particles is exceeded, a 3-dimensional gel structure starts to grow and fills the pore space, resulting in a thick layer of silica inside the porous material. The depth of the penetration depends on the porosity of the material treated and on the silica content in the sol, a low silica content resulting in deep penetration before gelling, in many cases up to 20 or 60 mm. In order to obtain a thick uniform silica layer inside the porous material, the treatment is preferably performed with a diluted silica sol and most preferably repeated one or several times after drying of the first layer. After the final treatment, the surface layer of the carbonatic material is preferably substantially saturated with silica gel. Preferably, the material is treated so to obtained a silica layer from the surface down to a depth of at least 10 mm, most preferable to a depth of at least 20 mm.

When an acidic silica sol is applied to the surface of a carbonatic material, the carbonate dissolves slightly and reacts with $H^+$ to $HCO_3^-$. The resulting deprotonation of the sol particles brings about an increase of the pH in the sol and gelling of the silica particles. Since the supply of proton-binding species proceeds from the surface of the carbonate grains, the gelling proceeds at the stone surface, coating it with a thin dense protective layer consisting of silica, suitably from about 0.05 to about 10 mm thick, preferably from about 0.5 to about 2 mm thick. The portion above the stone surface should preferably be thinner than 1 mm, most preferably thinner than 0.2 mm. Use of an acidic sol involves lower consumption of silica compared to the use of an alkaline sol.

By using a substantially pure silica sol, the appearance of the treated surface does not change significantly, and no unnatural elements, such as organic compounds, are incorporated into the treated material. It has been found that the protective silica layer is effectively prevented from being washed out of the stone. The silica protects the carbonatic material against acids and also significantly reduces penetration of water into the pore system. On the other hand, the silica layer is permeable to water vapour, thus allowing the material to breathe and preventing moisture from being permanently entrapped in the pores below the layer of silica gel. Another advantage is that the silica gel can transport water and salts dissolved therein out of the pore system, thus avoiding accumulation of the salts in the porous material treated.

In a preferred silica sol to be used, the average particle size, i.e. the mean particle diameter by numbers, may for example be within the range from about 1 to about 150 nm, but preferably the average particle size is within the range from about 10 to about 70 nm, and most preferably from about 20 to about 50 nm. The particle size distribution can be from almost monodisperse mean particle size, the standard deviation of the particle diameter for example being less than 10% by numbers of the mean particle diameter, and up to very wide, the standard deviation for example being up to or above about 140% by numbers of the mean particle diameter. Thus, if the mean particle diameter by numbers is about 35 nm, the standard deviation by numbers may for example be from below about 3.5 nm and up to or more than about 50 nm. Suitably, the particle size distribution is wide, the standard deviation of the particle diameter preferably being above about 30%, most preferably above about 55% by numbers of the mean particle diameter, and preferably below about 115%, most preferably below about 85% by numbers of the mean particle diameter. Both relatively large average particle size as well as broad particle size distribution enhance the high density of the silica layer formed in the pores of the treated material.

In order to avoid corrosion caused by easily soluble salts, the silica sol used should contain as small amounts as possible of dissolved ions. An anionic sol generally does not contain any significant amounts of dissolved anions, but in order to remain stable it must contain cations. According to the invention, metal cations, particularly alkali metal cations such as $Na^+$, $K^+$ and $Li^+$, should be avoided, since these ions may form salts easily soluble in water, involving the risk for the salts to be transported into the pore system inside the treated material where they can crystallize and destroy the material. The content of alkali metals expressed as $Na_2O$ should preferably be less than 0.1% by weight, most preferably less than 0.05% by weight. Therefore, the stabilizing counterions of the sol should mainly consist of other ions. An alkaline sol is preferably mainly stabilized with one or more of volatile cations such as $NH_4^+$, evaporating as ammonia from the material treated and leaving a clean alkali metal free protective layer. Also amines or quaternary amines could be used. An acidic sol is preferably mainly stabilized with $H^+$. The protons may originate from organic as well as inorganic acids.

Anionic silica sols, alkaline ammonium stabilized sols as well as acidic sols are well known per se, see for example R. K. Iler, "The Chemistry of Silica", John Wiley & Sons, New York 1979, particularly pages 312–61. Such sols are also commercially available, for example from Eka Nobel AB, Bohus, Sweden. As an example of a suitable alkaline sol Bindzil$^{(R)}$ 40NH$_3$/80 can be mentioned and as an example of a suitable acidic sol Bindzil$^{(R)}$ 30H/80 can be mentioned.

The porous material to be protected may for example include carbonatic stone such as limestone, dolomite, marble or calcareous sandstone, but also plaster, lime mortar or carbonate containing concrete. The method is useful for treating plain or painted surfaces of existing buildings, wallings, statues or other monuments, but also for treating blocks of stone or prefabricated building elements made of carbonatic material.

The porous material can be treated with an alkaline anionic silica sol only, with an acidic anionic silica sol only, or with both an alkaline and an acidic anionic silica sol.

According to one aspect of the invention, the method comprises one or more treatments with an alkaline silica sol resulting in deep saturation of the stone with silica, i.e. in formation of a dense protective silica layer within the pore system of the treated material, followed by one or more treatments with an acidic silica sol, resulting in saturation of the subsurface part of the material with silica, i.e. in formation of a dense protective silica layer within the pore system of the material.

It is also possible to use the silica sol as a primer, coating calcitic grains with $SiO_2$ film, before treating the material with silico-organic products.

The silica sol may be applied to the surface with conventional coating methods such as brushing, spraying or dipping, the protective layer being obtained after one or several subsequent treatments.

The invention also concerns porous, preferably carbonatic, building material such as blocks of stone or prefabricated building elements, which material comprises a layer of gelled silica sol present in the pores below the material surface, suitably substantially uniformly distributed within the pores from the surface to a depth of at least about 2 mm, preferably to a depth of at least about 10 mm, most preferably to a depth of at least about 20 mm. Preferably, the silica layer is substantially free from water soluble metal salts, particularly alkali metal salts. It is also preferred that the silica layer is substantially free from organic material. The silica layer inhibits penetration of water but is permeable to water vapour. Such material is obtainable by the present method of protecting porous material.

The invention is further illustrated through the following examples. The invention is however not limited to these examples, but only to the scope of the appended claims. If not otherwise stated, all percentages and parts refer to percents and parts by weight.

EXAMPLE 1

A 5×5×2 cm block was cut from a soft porous limestone from Pinczow—Poland, which is a Miocene sedimentary rock, built of calcitic organic remnants, with porosity of 25% and a bulk specific gravity of 1.75 g/cm$^3$. One of 5×5 cm surfaces was dipped into Bindzil$^{(R)}$ 30H/80 which is an acidic anionic silica sol. The sol is stabilized with H$^+$, and contains less than 0.05% Na$_2$O. The specific surface area was 80m$^2$/g, the mean particle diameter by numbers was about 35 nm with a standard deviation by numbers of 25 nm. About 95% by numbers of the particles had a size within the range from about 5 to about 150 nm. The pH was originally about 3–4, but after dilution to a dry content of about 25%, the pH was adjusted to about 5. After 20 minutes of impregnation, 3.05 g of dry material from the sol, corresponding to 12.2 g of the sol, had been taken up by the stone which then was allowed to dry in room temperature. The dipping was repeated 2 more times, until the stone could not absorb more of the sol, i.e. the pore space was filled with precipitated silica gel. After the final treatment, the cube had absorbed 3.9 g of dry material from the sol, corresponding to 15.6 g of the sol. Investigation by means of SEM (Scanning Electron Microscopy) supplied with an EPMA (Energy Dispersive Microanalyser), showed that the thickness of the protective silica gel layer was about 2–3 mm. The cube treated with the silica sol, had a water uptake coefficient W of 2.4 kg H$_2$O/m$^2$.h$^{0.5}$ which can be compared with an untreated stone having a coefficient W of 25 kg H$_2$O/m$^2$.h$^{0.5}$. Thus, it was shown that the layer of silica gel reduces the water penetration into the pore space of the stone.

EXAMPLE 2

In this experiment, an anionic alkaline silica sol of trademark Bindzil$^{(R)}$ 40NH$_3$/80 was used, the sol being stabilized with NH$_4^+$ and containing less than 0.05% of Na$_2$O, the pH being 9.5. The specific surface area, the mean particle size and the particle size distribution was the same as for the sol used in Example 1. The sol, which originally had a dry content of 40%, was diluted to about 25%, whereupon a block of limestone similar to those used in Example 1, was impregnated with the diluted sol for 20 min. After that time, 2.3 g of dry material from the sol, corresponding to 9.2 g of the sol, had been taken up by the stone. Then the blocks were left to dry until constant weight, and the impregnation procedure was repeated 2 more times. After the third impregnation, the total amount of adsorbed silica sol was 16.6 g which corresponds to 4.15 g of dry silica gel. A 10–12 mm thick and dense layer of silica gel was formed and was shown to significantly reduce the penetration of water into the stone. The water absorption coefficient W was determined to be 1.0 kg H$_2$O/m$^2$.h$^{0.5}$, as was established by measuring the capillary suction of water. As a comparison, the water absorption coefficient for untreated stone was found to be 25 kgH$_2$O/m$^2$.h$^{0.5}$.

EXAMPLE 3

Two blocks of limestone similar to those used in Examples 1 and 2, were first treated once with the alkaline silica sol Bindzil$^{(R)}$ 40NH$_3$/80 according to Example 2, and then treated twice with the acidic silica sol Bindzil$^{(R)}$ 30H/80 according to Example 1. A 8–10 mm thick dense layer of silica gel was formed, and the blocks were then allowed to dry.

EXAMPLE 4

Blocks prepared according to the examples 1, 2 and 3, as well as untreated blocks of limestone, were artificially weathered in a humid air containing SO$_2$. The artificial weathering involved the following three cycles:

(1) 2 hours treatment in an air stream having a temperature of 40° C., humidity of 95% RH and containing 55 ppm SO$_2$, the samples being cooled by cold water circulating through the sample holder, resulting in water precipitation on the sample surface.

(2) 5 hours treatment in an air stream having a temperature of 40°0 C., humidity of 95% RH and containing 55 ppm SO$_2$. The sample holder was not cooled, which resulted in formation of sulphuric acid at the sample surface.

(3) 5 hours treatment in an air stream having a temperature of 40° C., humidity of 40% RH and containing 55 ppm SO$_2$. The sample holder was not cooled and the water which condensed in the stone, evaporates.

The above described cycles were repeated for 96 hours, whereupon the samples were examined by a SEM supplied with an energy-dispersive microanalyser in order to determine the distribution of sulfur, giving an indication on the distribution of sulphates which are the main corrosion products, in the cross-section of the samples.

The untreated blocks exhibited a 1.0–1.2 mm thick corroded layer which showed distinct signs of disintegration.

The blocks treated with acidic silica sol only (Example 1), showed a corroded layer extending up to about 0.20–0.25 mm but with considerably reduced amount of the corrosion product—gypsum (CaSO$_4$·2H$_2$O), present.

The blocks treated with alkaline silica sol only (Example 2), showed even less of corrosion products and the state of preservation of their surface could be assessed as good. Gypsum, the corrosion product can be found only at the very surface of the tested samples—thickness of gypsum layer was about 0.05–0.10 mm.

The blocks treated first with alkaline sol and then with acidic sol (Example 3), showed a corroded layer extending to a depth of about 0.1 mm. The extent of damages was less than in case when the stone was treated with the acidic sol only (Example 1).

We claim:

1. A method for protecting a porous material sensitive to corrosion caused by pollutants present in the atmosphere, comprising treating the surface of the material with an agent, said agent containing (i) substantially no solid particles with a diameter exceeding about 1 micron and (ii) more than 90% by weight of silica sol having an alkali metal content in the sol, expressed as Na$_2$O, of less than 0.1% by weight, said silica sol being either anionic, alkaline and stabilized with volatile cations or acidic and stabilized with H$^+$ions, to form a layer of gelled silica sol within the pores below the surface of the porous material.

2. A method as claimed in claim 1, wherein the agent contains substantially no organic material.

3. A method as claimed in claim 2, wherein the agent consists essentially of silica sol.

4. A method as claimed in claim 2, wherein the mean diameter by numbers of particles in the sol is within the range from about 10 to about 70 nm.

5. A method as claimed in claim 2, wherein the standard deviation of the particle diameter of the sol is above about 30% by numbers of the mean particle diameter.

6. A method according to claim 2, wherein the method comprises one or more treatments with an alkaline silica sol followed by one or more treatments with an acidic silica sol.

7. A method as claimed in claim 1, wherein the agent consists essentially of silica sol.

8. A method as claimed in claim 7, wherein the mean diameter by numbers of particles in the sol is within the range from about 10 to about 70 nm.

9. A method as claimed in claim 7, wherein the standard deviation of the particle diameter of the sol is above about 30% by numbers of the mean particle diameter.

10. A method according to claim 7, wherein the method comprises one or more treatments with an alkaline silica sol followed by one or more treatments with an acidic silica sol.

11. A method as claimed in claim 1, wherein the mean diameter by numbers of particles in the sol is within the range from about 10 to about 70 nm.

12. A method as claimed in claim 11, wherein the standard deviation of the particle diameter of the sol is above about 30% by numbers of the mean particle diameter.

13. A method according to claim 11, wherein the method comprises one or more treatments with an alkaline silica sol followed by one or more treatments with an acidic silica sol.

14. A method as claimed in claim 1, wherein the standard deviation of the particle diameter of the sol is above about 30% by numbers of the mean particle diameter.

15. A method according to claim 14, wherein the method comprises one or more treatments with an alkaline silica sol followed by one or more treatments with an acidic silica sol.

16. A method according to claim 1, wherein the method comprises one or more treatments with an alkaline silica sol followed by one or more treatments with an acidic silica sol.

17. A method as claimed in claim 1, wherein the volatile cations are ammonium cations.

18. The method according to claim 1 where the silica sol is anionic, alkaline and stabilized with volatile cations.

19. A method as claimed in claim 1, wherein said silica sol has a silica content of more than 10% by weight.

20. A porous building material comprising a layer of gelled silica sol present in the pores below the material surface substantially uniformly distributed within the pores from the surface to a depth of at least about 2 mm, said silica sol containing less than 0.1% by weight of alkali metal, expressed as $Na_2O$ and said gelled silica sol containing substantially no particles with a diameter exceeding about 1 micron.

21. A building material as claimed in claim 20, wherein the silica layer is substantially free from water-soluble metal salts.

22. A building material as claimed in claim 21, wherein the silica layer is substantially free from organic material.

23. A building material as claimed in claim 20, wherein the silica layer is substantially free from organic material.

* * * * *